United States Patent
Subramanian et al.

(10) Patent No.: US 12,517,656 B2
(45) Date of Patent: Jan. 6, 2026

(54) COOPERATIVE ADAPTIVE THROTTLING BETWEEN HOSTS AND DATA STORAGE SYSTEMS

(71) Applicant: Dell Products L.P., Hopkinton, MA (US)

(72) Inventors: Vasudevan Subramanian, Chapel Hill, NC (US); Vamsi K. Vankamamidi, Hopkinton, MA (US); Maher Kachmar, Dearborn, MI (US)

(73) Assignee: Dell Products L.P., Hopkinton, MA (US)

( * ) Notice: Subject to any disclaimer, the term of this patent is extended or adjusted under 35 U.S.C. 154(b) by 194 days.

(21) Appl. No.: 18/472,547

(22) Filed: Sep. 22, 2023

(65) Prior Publication Data
US 2025/0103207 A1  Mar. 27, 2025

(51) Int. Cl.
*G06F 3/00* (2006.01)
*G06F 3/06* (2006.01)

(52) U.S. Cl.
CPC .......... *G06F 3/0611* (2013.01); *G06F 3/0608* (2013.01); *G06F 3/0631* (2013.01); *G06F 3/067* (2013.01)

(58) Field of Classification Search
CPC ..... G06F 3/0608; G06F 3/0611; G06F 3/0631
See application file for complete search history.

(56) References Cited

U.S. PATENT DOCUMENTS

| | | | | |
|---|---|---|---|---|
| 8,341,300 | B1* | 12/2012 | Karamcheti | G06F 13/1642 710/52 |
| 11,385,928 | B2* | 7/2022 | Vankamamidi | G06F 3/0673 |
| 12,032,858 | B1* | 7/2024 | Subramanian | G06F 3/0611 |
| 2014/0215129 | A1* | 7/2014 | Kuzmin | G06F 12/0246 711/103 |
| 2015/0212738 | A1* | 7/2015 | D'Eliseo | G06F 12/00 711/154 |
| 2016/0342328 | A1* | 11/2016 | Rangarajan | G06F 3/0634 |
| 2018/0246664 | A1* | 8/2018 | Wu | G06F 3/0679 |
| 2018/0288155 | A1* | 10/2018 | Zhou | G06F 3/0659 |
| 2019/0332326 | A1* | 10/2019 | Lv | G06F 3/0673 |
| 2020/0285398 | A1* | 9/2020 | Krishnamurthy | G06F 3/061 |
| 2021/0034556 | A1* | 2/2021 | Armangau | G06F 13/20 |
| 2024/0192888 | A1* | 6/2024 | Zhu | G06F 3/0659 |

* cited by examiner

*Primary Examiner* — Reginald G Bragdon
*Assistant Examiner* — Michael L Westbrook
(74) *Attorney, Agent, or Firm* — BainwoodHuang

(57) ABSTRACT

In at least one embodiment, processing can include: sending, from a host to a data storage system, a first storage reclamation command that identifies a first storage region of physical storage available for reclamation and reuse; in response to the data storage system receiving the first storage reclamation command, sending from the data storage system to the host first feedback information identifying at least a first detected condition on the data storage system; and in response to receiving the first feedback information at the host, the host varying a current rate or frequency of subsequent storage reclamation commands sent to the data storage system based, at least in part, on the first feedback information regarding the first detected condition on the data storage system.

20 Claims, 9 Drawing Sheets

| Storage System Condition | SCSI Sense code | Host Action |
|---|---|---|
| Normal range | None | None |
| Latency 10% above threshold | 0x6 0x38 0x50 | Reduce UNMAP rate to 90% of default |
| Latency 20% above threshold | 0x6 0x38 0x51 | Reduce UNMAP rate to 80% of default |
| Latency 50% above threshold | 0x6 0x38 0x52 | Reduce UNMAP rate to 50% of default |
| Latency 80% above threshold | 0x6 0x38 0x53 | Reduce UNMAP rate to 20% of default |
| Latency >100% above threshold | 0x6 0x38 0x54 | Reduce UNMAP rate to 10% of default |

FIG. 4

| Storage System Condition | SCSI Sense code | Host Action |
|---|---|---|
| Normal range | None | None |
| Quantity (Q) > THRESH1, and Also Q < THRESH2 | 0x6 0x38 0x70 | Reduce UNMAP rate to X1% of default |
| THRESH2 ≤ Q < THRESH3 | 0x6 0x38 0x71 | Reduce UNMAP rate to X2% of default, where X1 < X2. |
| THRESH3 ≤ Q | 0x6 0x38 0x72 | Reduce UNMAP rate to X3% of default, where X2 < X3. |

| Storage System Condition | SCSI Sense code | Host Action |
|---|---|---|
| Normal range | None | None |
| Capacity consumption threshold 90% | 0x6 0x38 0x60 | Increase UNMAP rate to 120% of default |
| Capacity consumption threshold 92% | 0x6 0x38 0x61 | Increase UNMAP rate to 130% of default |
| Capacity consumption threshold 95% | 0x6 0x38 0x62 | Increase UNMAP rate to 150% of default |
| Capacity consumption threshold 97% | 0x6 0x38 0x63 | Increase UNMAP rate to 200 % of default |

| Storage System Condition | SCSI Sense code | Host Action |
|---|---|---|
| Normal range | None | None |
| Free capacity threshold 10% | 0x6 0x38 0x60 | Increase UNMAP rate to 120% of default |
| Free Capacity threshold 8% | 0x6 0x38 0x61 | Increase UNMAP rate to 130% of default |
| Free capacity threshold 5% | 0x6 0x38 0x62 | Increase UNMAP rate to 150% of default |
| Free capacity threshold 3% | 0x6 0x38 0x63 | Increase UNMAP rate to 200% of default |

FIG. 7

COOPERATIVE ADAPTIVE THROTTLING BETWEEN HOSTS AND DATA STORAGE SYSTEMS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: sending, from a host to a data storage system, a first storage reclamation command that identifies a first storage region of physical storage available for reclamation and reuse; in response to the data storage system receiving the first storage reclamation command, sending from the data storage system to the host first feedback information identifying at least a first detected condition on the data storage system; and in response to receiving the first feedback information at the host, the host varying a current rate or frequency of subsequent storage reclamation commands sent to the data storage system based, at least in part, on the first feedback information regarding the first detected condition on the data storage system.

In at least one embodiment, the first storage region can correspond to a portion of physical storage of the data storage system mapped to one or more deleted storage objects. The one or more deleted storage objects can include any of: one or more deleted files, a deleted file system, one or more deleted portions of one or more file systems, and one or more deleted directories. Processing can include: servicing the first storage reclamation command on the data storage system and reclaiming the first storage region as free, available or unused storage capacity; and updating one or more storage capacity metrics in accordance with said reclaiming the first storage region. Updating can further comprise increasing, by a first amount, a first storage metric denoting an amount of free storage capacity in the data storage system, wherein the first amount corresponds to an amount of storage capacity of the first storage region that has been reclaimed. Updating can further comprise decreasing, by a first amount, a first storage metric denoting an amount of consumed or utilized storage capacity in the data storage system, wherein the first amount corresponds to an amount of storage capacity of the first storage region that has been reclaimed.

In at least one embodiment, the first detected condition of the first feedback information can indicate that a first latency metric on the data storage system exceeds a specified latency threshold. In response to receiving the first feedback information at the host, the host can reduce the current rate or frequency at which the host sends subsequent storage reclamation commands to the data storage system. The first feedback information can indicate that the first latency metric on the data storage system exceeds the specified latency threshold by a first amount. The host can reduce the current frequency or rate at which the host sends subsequent storage reclamation commands to the data storage system by a first reduction amount based, at least in part, on the first amount by which the first latency metric of the data storage system exceeds the specified threshold. The host reducing the current frequency or rate at which the host sends subsequent storage reclamation commands to the data storage system can be expected to reduce measured request latency, including I/O latency and I/O response time, on the data storage system.

In at least one embodiment, processing can include the data storage system monitoring a plurality of storage reclamation commands waiting in a queue for processing by the data storage system, wherein the plurality of storage reclamation commands includes a second storage reclamation command denoting a next of the plurality of storage reclamation commands to be processed, wherein said second reclamation command has been waiting in the queue longer than any others of the plurality of storage reclamation commands, wherein said monitoring includes calculating a corresponding accumulated latency of the second storage reclamation command denoting a total amount of time the second storage reclamation command has waited for processing by the data storage system, and wherein the corresponding accumulated latency of the second storage reclamation command can be the first latency metric on the data storage system.

In at least one embodiment, processing can include the data storage system monitoring a quantity of storage reclamation commands waiting in one or more queues for processing by the data storage system, and wherein the quantity of storage reclamation commands waiting for processing can be the first latency metric on the data storage system, and wherein the quantity can denote any of: a maximum number of storage reclamation commands awaiting processing during a specified time period, and an average number of storage reclamation commands awaiting processing during a specified time period.

In at least one embodiment, the first detected condition of the first feedback information can indicate one or more of: that consumed storage capacity of the data storage system has exceeded a first capacity threshold, and that free storage capacity of the data storage system has fallen below a free capacity threshold. In response to receiving the first feedback information at the host, the host can increase the current rate or frequency at which the host sends subsequent storage reclamation commands to the data storage system. The host can increase the current frequency or rate at which the host sends subsequent storage reclamation commands to the data storage system by a first amount based, at least in part, on current capacity consumption and/or current free storage capacity as identified in the first feedback information from the data storage system. The first storage reclamation command can be any of an unmap command, a deallocate command, and an unallocate command.

In at least one embodiment, processing can include: sending, from the data storage system to the host, a first reply including a status indicator that additional status information is available regarding the first storage reclamation command; in response to receiving the first reply, the host sending to the data storage system a request for the additional status information; and in response to receiving the request for the additional status information, the data storage system sending the first feedback information to the host.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 4, 5, 6 and 7 are examples of tables of information that can be included in feedback information provided to hosts and corresponding host actions in at least one embodiment in accordance with techniques of the present disclosure.

DETAILED DESCRIPTION OF EMBODIMENT(S)

Figure 1:
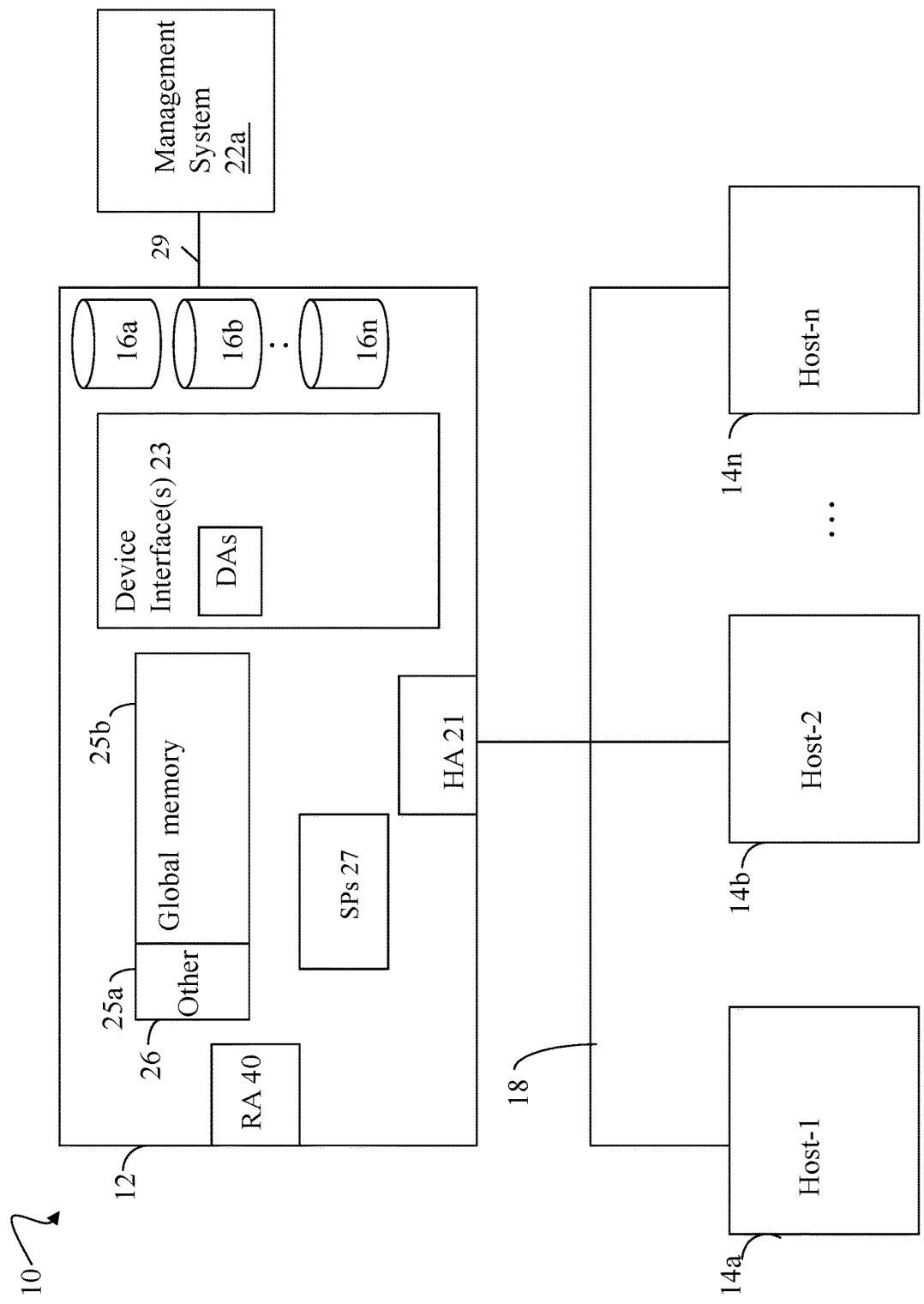
FIG. 1 is an example of components that can be included in a system in accordance with the techniques of the present disclosure.

Multiple hosts in a data center can connect to one or more storage systems or appliances for storage access. The number of such hosts connected to a single storage system or appliance can be, for example, thousands of hosts. The hosts can be running a variety of different operating systems. In some embodiments, at least some of the hosts can have virtualized environments running virtual machines (VMs) on corresponding operating systems. Additionally, at least some hosts can be included in clusters. Applications running on the hosts and/or clusters of hosts can run independently and each such application can expect a corresponding application level of performance such as based, at least in part, on a defined service level agreement (SLA). For example, an SLA for an application or host can specify target performance metrics, such as I/O response time, guaranteed to be maintained for the application or host. I/O performance can be adversely affected by increases in latency of I/O operations and/or other commands and requests. More generally, some commands that consume a relatively large amount of one or more storage system resources can adversely impact system performance and, in particular, other more common requests such as I/O operations.

Hosts, and applications executing thereon, can issue read and/or write requests such as read and/or write I/O operations. In addition to read and/or write requests, host can also issue other types of commands or requests such as SCSI UNMAP, XCOPY and WRITESAME commands. In some systems running VMs, hosts can issue virtual volume (VVOL) requests or operations where the storage system can perform bulk copy operations based on bitmaps or differences. Many of these additional commands, requests or operations issued in addition to read and/or write requests can consume storage system resources that would otherwise be used in connection with servicing read and/or write requests. Such storage system resources can include, for example, CPU or processor core resources, backend (BE) storage system resources, cache, and/or possibly other resources. Such additional commands, such as UNMAP, XCOPY and WRITESAME, may typically have a large associated size denoting, respectively, an amount of storage freed, an amount of content or data copied, and an amount of content or data written. As a result of the system resources consumed when servicing the additional commands, read and/or write requests as well as overall request latency, including I/O latency with respect to host read and/or write requests, can be adversely impacted.

The SCSI UNMAP command noted above is one example of such an additional command or request that can generally be characterized as having a high associated processing cost on the storage system based, at least in part, on the typical storage region size of the UNMAP command. The SCSI UNMAP command is generally not latency sensitive or critical with respect to the issuing host such that the UNMAP command under normal operating conditions does not need to be completed in a timely manner in comparison, for example, to read and write I/O typically issued by an application executing on a host. More generally, such additional commands or operations besides read and/or write requests can be characterized as not latency sensitive or critical with respect to the issuing host under normal operating conditions. In some systems, additional commands or requests such as the UNMAP command noted above can be characterized as background operations where servicing such commands or requests like the UNMAP command can be performed as background operations at various points in time depending, at least in part, on the overall performance and/or I/O workload of the system. At least some of the additional commands such as UNMAP can typically be expected to consume a relatively large amount of one or more system resources, such as CPU resources. Thus in times of heavy I/O workload, the system may choose to at least temporarily defer servicing UNMAP and other background operations to allow higher priority I/O and other higher priority operation processing.

It can be beneficial to hosts, and applications executing thereon, in some scenarios to throttle or vary the amount of storage resources consumed at various points in time by additional or background commands to minimize adverse performance or latency impact on read and/or write requests, or more generally, minimize adverse performance or latency impact on higher priority and/or latency sensitive commands.

One solution can be for the storage appliance to delay processing or acknowledging to the clients the additional background or lower priority commands or operations, such as the UNMAP commands, in order to limit the resources consumed by such lower priority operations to thereby allow such resources to be available for use by higher priority I/O operations or requests. One drawback with this solution is that the host and other client I/O operations, as well as other critical higher priority commands, can be queued on hosts behind the delayed UNMAP and other additional lower priority commands. As a result of delaying performance, completion and/or storage system acknowledgement of the UNMAP commands, other possibly higher priority commands, including I/O operations, can await subsequent processing on host-side queues and can also be undesirably delayed. Thus, the latency of I/O operations and other higher priority commands can be adversely impacted as well as adversely impacting overall application performance.

A second solution can include each individual host monitoring the performance of its read and write I/O operations where the host can regulate its optional additional lower priority workload and commands, such as UNMAP commands. For example, if a host monitors its I/O performance and notes that the I/O latency, or general request latency, increases above a threshold, the host can reduce the number and rate at which the host sends optional additional lower priority commands, such as UNMAP commands, to the storage system. However, this second solution can generally only work if only a single host is connected to the storage system. With multiple hosts, such as thousands of hosts and clusters of hosts connected to a single storage system, the second solution does not generally work due to the need to have an aggregated collective view of the workload on the storage system from across all connected hosts since, for example, the storage system workload from one host can affect the storage system workload of other hosts. To illustrate, consider one host A in a cluster where host A does not have any application I/O activity but is doing filesystem cleanup work including performing UNMAP operations. For this host A individually there is no need to regulate UNMAP operations as there is no impact on host A's application performance. However, at the same time consider another Host B in the cluster can have a heavy I/O workload for its applications and host B can perform minimal UNMAP operations. Due to the small or minimal number of UNMAP operations performed by host B, the second host B varying or reducing its UNMAP operations will generally not yield substantive improvements in its application I/O workload performance. The foregoing can be characterized as a classic split-brain problem between hosts in the same cluster. More generally, a drawback of the second solution is that a more aggregated or collective view regarding the multiple hosts' workloads is needed to be able to throttle or vary host workloads to efficiently optimize storage system performance including latency and other detected storage system conditions discussed below.

Accordingly, described in the following paragraphs are techniques that overcome the foregoing and other drawbacks. In at least one embodiment, the techniques of the present disclosure can be used to throttle or vary the amount of storage resources consumed at various points in time by the SCSI UNMAP commands and other additional lower priority and/or non-latency sensitive operations to minimize adverse performance or latency impact on higher priority and/or latency sensitive commands or requests including read and/or write I/Os.

In at least one embodiment, the storage system or appliance can have a collective or aggregate view of its I/O workload and also its background workload from all connected hosts and applications. In at least one embodiment, at least some of the additional lower priority and/or non-latency sensitive operations such as the SCSI UNMAP command can be serviced in connection with the background workload and can consume a large amount of processing and other resources. In at least one embodiment, the background workload can include performing lower priority background operations or commands such as the UNMAP command. In such an embodiment under normal operating conditions, servicing I/O operations and thus I/O workload can be given a higher priority than performing operations or commands of the background workload. At various points in time, the operating conditions or state of the storage system can change such that it can be desirable to throttle, shift or vary the types of operations and thus throttle, shift or vary the I/O workload and background workload. In at least one embodiment, the storage system performing the monitoring of its aggregated collective workloads can provide feedback in the form of hints to one or more hosts or other storage clients such that the hosts or other storage clients can accordingly vary the rate at which they send background workload, including lower priority and/or non-latency sensitive commands or requests, to the storage system.

In at least one embodiment, the storage system can monitor one or more conditions regarding the state of storage system. For example in at least one embodiment, the storage system can monitor the performance impact of UNMAP and/or other additional non-latency sensitive commands or background operations on read and/write requests such as read and/or write I/O operations (or more generally I/O workload). As another example in at least one embodiment, the storage system can monitor the amount of consumed or utilized storage capacity and/or free storage capacity in the storage system. Based, at least in part, on the state of the one or more conditions of state of the storage system, the storage system can send hints to one or more hosts to regulate, throttle and/or vary the rate at which such one or more hosts send background operations or non-latency sensitive commands to the storage system.

In at least one embodiment, if request or command latency, such as of one or more background requests such as UNMAP commands, exceeds a specified threshold, the storage system can provide feedback in the form of hints to a host to reduce the rate at which the host sends background operations or lower priority non-latency sensitive commands to the storage system. In at least one embodiment, the larger the amount by which the storage system exceeds the threshold latency, the larger the amount the requested rate reduction of background operations or lower priority non-latency sensitive commands. In at least one embodiment, the requested reduction rate can be based, at least in part, on the amount by which the measured latency such as of UNMAP commands exceeds a specified threshold. In at least one embodiment, the latency and associated impact on queued commands or requests awaiting processing or servicing can be measured using one or more metrics, where some examples of latency-related metrics are discussed elsewhere herein.

In at least one embodiment, the storage system can monitor the amount of consumed or free storage in order to detect an out of storage (OOS) condition or state and/or detect when the system is approaching an OOS condition or state. In at least one embodiment, a system can detect when the amount of free storage in the system approaches or nears an OOS condition such as when the amount of free or unused storage capacity of physical storage in the system falls below a threshold percentage of free storage. In at least one embodiment, the foregoing threshold percentage of free storage can be 20% or other suitable percentage or amount that can vary with embodiment. In at least one embodiment, the OOS condition, or near OOS condition, can occur when the amount or percentage of free storage falls below a specified threshold. In at least one embodiment, the OOS condition, or near OOS condition, can occur when the amount or percentage of consumed or utilized storage capacity exceeds a specified threshold. In at least one embodiment, when the storage system detects that an OOS condition has occurred, or is within a specified amount of the OOS condition-related threshold, the storage system can send hints to one or more hosts requesting that such one or more hosts increase the rate at which the host sends one or more particular types of background operations or non-latency sensitive commands to the storage system. The one or more particular types of background operations or non-latency sensitive commands can, if serviced, increase the amount of free or available storage capacity in the storage system available for consumption. The one or more particular types of background operations or non-latency sensitive commands can, if serviced, can be expected to result in storage reclamation in the storage system thereby increasing the amount of free or available storage capacity in the storage system.

In at least one embodiment, the SCSI UNMAP command can be a background operation or non-latency sensitive command that results in storage reclamation. In at least one embodiment, in response to detecting an OOS condition, the storage system can send hints to one or more hosts to increase the rate at which such one or more hosts send storage reclamation commands, such as UNMAP commands, to the storage system in attempts to increase the amount of free storage in the storage system and thereby alleviate or eliminate the OOS condition.

In at least one embodiment, the larger the amount by which the storage system exceeds a capacity consumption threshold denoting an OOS condition, the larger the amount of the requested rate increase of UNMAP or other background operations or non-latency sensitive commands that increase the amount of free storage. In at least one embodiment, the requested rate increase sent in the form of hints or feedback to one or more hosts can be based, at least in part, on the amount by which the current level of free or available storage capacity is below a specified minimum threshold. In at least one embodiment, the requested rate increase can be based, at least in part, on the amount by which the current level of utilized or consumed storage capacity is above a specified maximum threshold.

In at least one embodiment, the storage system can provide feedback in the form of hints to one or more hosts to regulate or vary the rate at which such hosts send background operations or lower priority non-latency sensitive commands to the storage system. In at least one embodiment, the feedback or hints can be sent from the storage system to one or more hosts responsive to the storage system detecting the occurrence of one or more conditions. In at least one embodiment, the one or more conditions can include a first condition that denotes when a current measured latency is higher than a specified latency threshold thereby denoting an adverse performance impact on I/O requests as well as other higher priority and/or critical commands or requests. In response to detecting the first condition, the storage system can provide feedback to one or more hosts to reduce the rate at which one or more background operations or non-latency sensitive commands or typically lower priority commands are sent to the storage system where such commands can be expected to consume a large amount of one or more resources, such as CPU resources, exceeding a specified threshold. In at least one embodiment, the one or more conditions can include a second condition that denotes when an OOS condition has occurred, or is nearing such as within a specified window or percentage of an OOS threshold. In response to detecting the second condition, the storage system can provide feedback to one or more hosts to increase the rate at which one or more background operations or non-latency sensitive commands are sent to the storage system, where such commands can be expected to result in increasing the available or free storage capacity of the storage system.

In at least one embodiment, the techniques of the present disclosure provide for the storage system monitoring the state of the storage system. The storage system can have an aggregate or collective view of the overall I/O workload and background workload with respect to all hosts connected to the storage system. The storage system can, for example, monitor the performance impact of the storage system's background workload, such as from UNMAP commands, on overall I/O workload, including read/write I/Os. The storage system can also monitor other conditions of the storage system, such as the OOS condition. In response to the current state of the storage system based on one or more monitored conditions, the storage system can send suitable hints to hosts to vary or regulate their corresponding rates at which background operations, lower priority and/or non-latency sensitive commands, such as UNMAP commands, are sent to the storage system. In at least one embodiment, when the storage system detects that current measured latency exceeds a threshold, the storage system can provide suitable hints to the hosts with the goal of having the hosts reduce or lower the transmission rate of background operations, lower priority and/or non-latency sensitive requests such as UNMAP commands. The foregoing can have a goal of allowing resources, that would have been used for background operations, lower priority and/or non-latency sensitive commands, to alternatively be used in connection with servicing higher priority commands and requests including I/O workload, such as read and write I/O requests, to thereby reduce the request or command latency, including I/O latency. In at least one embodiment, when the storage system detects an OOS condition, the storage system can provide suitable hints to the hosts with the goal of having the hosts increase the number or the rate of background operations or requests such as UNMAP commands which are expected to result in increasing the amount of free or available storage capacity in the storage system and thereby alleviate or remove the OOS condition.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
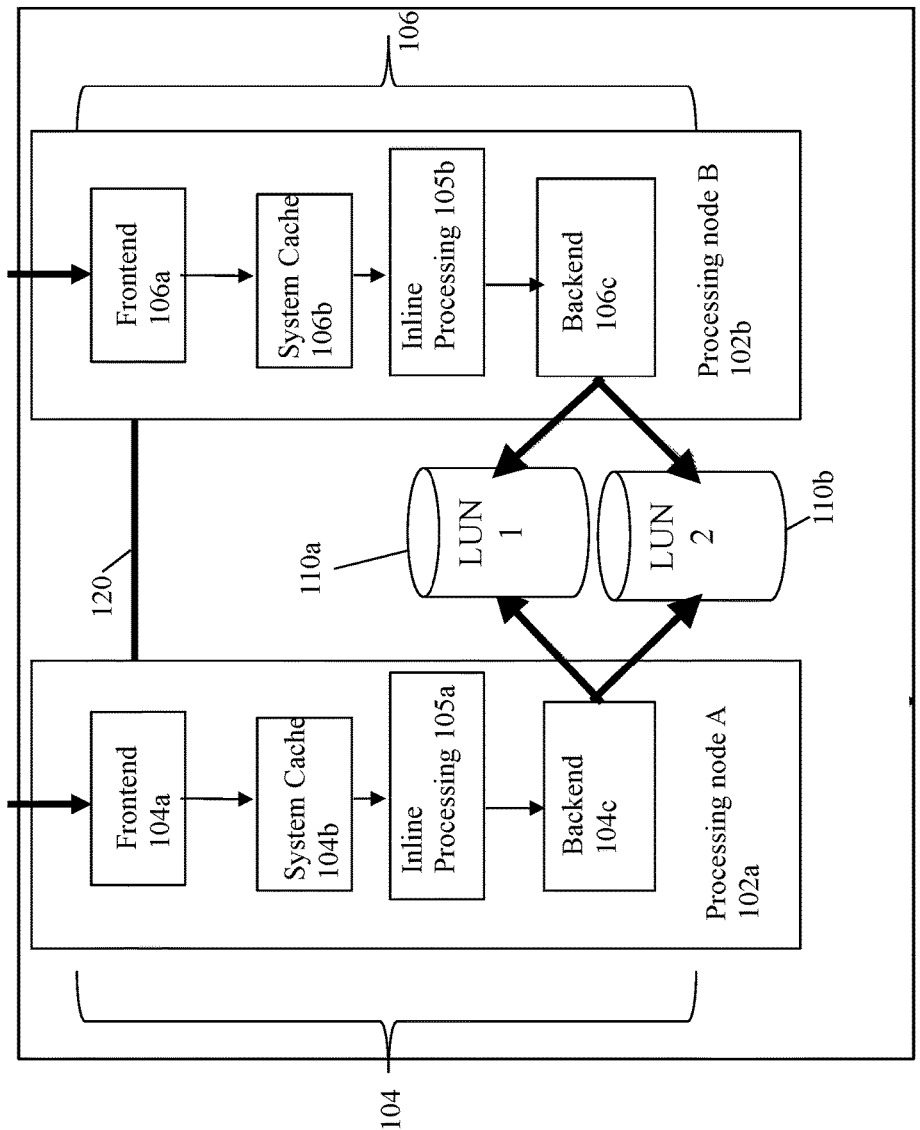
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with discussion herein, multiple hosts in a data center can connect to one or more storage systems or appliances for storage access. The number of such hosts connected to a single storage system or appliance can be, for example, thousands of hosts. The hosts can be running a variety of different operating systems. In some embodiments, at least some of the hosts can have virtualized environments running virtual machines (VMs) on corresponding operating systems. Additionally, at least some hosts can be included in clusters. Applications running on the hosts and/or clusters of hosts can run independently and each such application can expect a corresponding application level of performance such as based, at least in part, on a defined service level agreement (SLA). For example, an SLA for an application or host can specify target performance metrics, such as I/O response time, guaranteed to be maintained for the application or host. I/O performance can be adversely affected by increases in latency of I/O operations and/or other commands and requests. More generally, some commands that consume a relatively large amount of one or more storage system resources can adversely impact system performance and, in particular, other more common requests such as I/O operations.

Hosts, and applications executing thereon, can issue read and/or write requests such as read and/or write I/O operations. In addition to read and/or write requests, host can also issue other types of commands or requests such as SCSI UNMAP, XCOPY and WRITESAME commands. In some systems running VMs, hosts can issue virtual volume (VVOL) requests or operations where the storage system can perform bulk copy operations based on bitmaps or differences. Many of these additional commands, requests or operations issued in addition to read and/or write requests can consume storage system resources that would otherwise be used in connection with servicing read and/or write requests. Such storage system resources can include, for example, CPU or processor core resources, backend (BE) storage system resources, cache, and/or possibly other resources. Such additional commands, such as UNMAP, XCOPY and WRITESAME, may typically have a large associated size denoting, respectively, an amount of storage freed, an amount of content or data copied, and an amount of content or data written. As a result of the system resources consumed when servicing the additional commands, read and/or write requests as well as overall request latency, including I/O latency with respect to host read and/or write requests, can be adversely impacted.

The SCSI UNMAP command noted above is one example of such an additional command or request that can generally be characterized as having a high associated processing cost on the storage system based, at least in part, on the typical storage region size of the UNMAP command. The SCSI UNMAP command is generally not latency sensitive or critical with respect to the issuing host such that the UNMAP command under normal operating conditions does not need to be completed in a timely manner in comparison, for example, to read and write I/O typically issued by an application executing on a host. More generally, such additional commands or operations besides read and/or write requests can be characterized as not latency sensitive or critical with respect to the issuing host under normal operating conditions. In some systems, additional commands or requests such as the UNMAP command noted above can be characterized as background operations where servicing such commands or requests like the UNMAP command can be performed as background operations at various points in time depending, at least in part, on the overall performance and/or I/O workload of the system. At least some of the additional commands such as UNMAP can typically be expected to consume a relatively large amount of one or more system resources, such as CPU resources. Thus in times of heavy I/O workload, the system may choose to at least temporarily defer servicing UNMAP and other background operations to allow higher priority I/O and other higher priority operation processing.

It can be beneficial to hosts, and applications executing thereon, in some scenarios to throttle or vary the amount of storage resources consumed at various points in time by additional or background commands to minimize adverse performance or latency impact on read and/or write requests, or more generally, minimize adverse performance or latency impact on higher priority and/or latency sensitive commands.

One solution can be for the storage appliance to delay processing or acknowledging to the clients the additional background or lower priority commands or operations, such as the UNMAP commands, in order to limit the resources consumed by such lower priority operations to thereby allow such resources to be available for use by higher priority I/O operations or requests. One drawback with this solution is that the host and other client I/O operations, as well as other critical higher priority commands, can be queued on hosts behind the delayed UNMAP and other additional lower priority commands. As a result of delaying performance, completion and/or storage system acknowledgement of the UNMAP commands, other possibly higher priority commands, including I/O operations, can await subsequent processing on host-side queues and can also be undesirably delayed. Thus, the latency of I/O operations and other higher priority commands can be adversely impacted as well as adversely impacting overall application performance.

A second solution can include each individual host monitoring the performance of its read and write I/O operations where the host can regulate its optional additional lower priority workload and commands, such as UNMAP commands. For example, if a host monitors its I/O performance and notes that the I/O latency, or general request latency, increases above a threshold, the host can reduce the number and rate at which the host sends optional additional lower priority commands, such as UNMAP commands, to the storage system. However, this second solution can generally only work if only a single host is connected to the storage system. With multiple hosts, such as thousands of hosts and clusters of hosts connected to a single storage system, the second solution does not generally work due to the need to have an aggregated collective view of the workload on the storage system from across all connected hosts since, for example, the storage system workload from one host can affect the storage system workload of other hosts. To illustrate, consider one host A in a cluster where host A does not have any application I/O activity but is doing filesystem cleanup work including performing UNMAP operations. For this host A individually there is no need to regulate UNMAP operations as there is no impact on host A's application performance. However, at the same time consider another Host B in the cluster can have a heavy I/O workload for its applications and host B can perform minimal UNMAP operations. Due to the small or minimal number of UNMAP operations performed by host B, the second host B varying or reducing its UNMAP operations will generally not yield substantive improvements in its application I/O workload performance. The foregoing can be characterized as a classic split-brain problem between hosts in the same cluster. More generally, a drawback of the second solution is that a more aggregated or collective view regarding the multiple hosts' workloads is needed to be able to throttle or vary host workloads to efficiently optimize storage system performance including latency and other detected storage system conditions discussed below.

Accordingly, described in the following paragraphs are techniques that overcome the foregoing and other drawbacks. In at least one embodiment, the techniques of the present disclosure can be used to throttle or vary the amount of storage resources consumed at various points in time by the SCSI UNMAP commands and other additional lower priority and/or non-latency sensitive operations to minimize adverse performance or latency impact on higher priority and/or latency sensitive commands or requests including read and/or write I/Os.

In at least one embodiment, the storage system or appliance can have a collective or aggregate view of its I/O workload and also its background workload from all connected hosts and applications. In at least one embodiment, at least some of the additional lower priority and/or non-latency sensitive operations such as the SCSI UNMAP command can be serviced in connection with the background workload and can consume a large amount of processing and other resources. In at least one embodiment, the background workload can include performing lower priority background operations or commands such as the UNMAP command. In such an embodiment under normal operating conditions, servicing I/O operations and thus I/O workload can be given a higher priority than performing operations or commands of the background workload. At various points in time, the operating conditions or state of the storage system can change such that it can be desirable to throttle, shift or vary the types of operations and thus throttle, shift or vary the I/O workload and background workload. In at least one embodiment, the storage system performing the monitoring of its aggregated collective workloads can provide feedback in the form of hints to one or more hosts or other storage clients such that the hosts or other storage clients can accordingly vary the rate at which they send background workload, including lower priority and/or non-latency sensitive commands or requests, to the storage system.

In at least one embodiment, the storage system can monitor one or more conditions regarding the state of storage system. For example in at least one embodiment, the storage system can monitor the performance impact of UNMAP and/or other additional non-latency sensitive commands or background operations on read and/write requests such as read and/or write I/O operations (or more generally I/O workload). As another example in at least one embodiment, the storage system can monitor the amount of consumed or utilized storage capacity and/or free storage capacity in the storage system. Based, at least in part, on the state of the one or more conditions of state of the storage system, the storage system can send hints to one or more hosts to regulate, throttle and/or vary the rate at which such one or more hosts send background operations or non-latency sensitive commands to the storage system.

In at least one embodiment, if request or command latency, such as of one or more background requests such as UNMAP commands, exceeds a specified threshold, the storage system can provide feedback in the form of hints to a host to reduce the rate at which the host sends background operations or lower priority non-latency sensitive commands to the storage system. In at least one embodiment, the larger the amount by which the storage system exceeds the threshold latency, the larger the amount the requested rate reduction of background operations or lower priority non-latency sensitive commands. In at least one embodiment, the requested reduction rate can be based, at least in part, on the amount by which the measured latency such as of UNMAP commands exceeds a specified threshold. In at least one embodiment, the latency and associated impact on queued commands or requests awaiting processing or servicing can be measured using one or more metrics, where some examples of latency-related metrics are discussed elsewhere herein.

In at least one embodiment, the storage system can monitor the amount of consumed or free storage in order to detect an out of storage (OOS) condition or state and/or detect when the system is approaching an OOS condition or state. In at least one embodiment, a system can detect when the amount of free storage in the system approaches or nears an OOS condition such as when the amount of free or unused storage capacity of physical storage in the system falls below a threshold percentage of free storage. In at least one embodiment, the foregoing threshold percentage of free storage can be 20% or other suitable percentage or amount that can vary with embodiment. In at least one embodiment, the OOS condition, or near OOS condition can occur when the amount or percentage of free storage falls below a specified threshold. In at least one embodiment, the OOS condition can occur when the amount or percentage of consumed or utilized storage capacity exceeds a specified threshold. In at least one embodiment, when the storage system detects that an OOS condition has occurred, or is within a specified amount of the OOS condition-related threshold, the storage system can send hints to one or more hosts requesting that such one or more hosts increase the rate at which the host sends one or more particular types of background operations or non-latency sensitive commands to the storage system. The one or more particular types of background operations or non-latency sensitive commands can, if serviced, increase the amount of free or available storage capacity in the storage system available for consumption. The one or more particular types of background operations or non-latency sensitive commands can, if serviced, can be expected to result in storage reclamation in the storage system thereby increasing the amount of free or available storage capacity in the storage system.

In at least one embodiment, the SCSI UNMAP command can be a background operation or non-latency sensitive command that results in storage reclamation. In at least one embodiment, in response to detecting an OOS condition, the storage system can send hints to one or more hosts to increase the rate at which such one or more hosts send storage reclamation commands, such as UNMAP commands, to the storage system in attempts to increase the amount of free storage in the storage system and thereby alleviate or eliminate the OOS condition.

In at least one embodiment, the larger the amount by which the storage system exceeds a capacity consumption threshold denoting an OOS condition, the larger the amount of the requested rate increase of UNMAP or other background operations or non-latency sensitive commands that increase the amount of free storage. In at least one embodiment, the requested rate increase sent in the form of hints or feedback to one or more hosts can be based, at least in part, on the amount by which the current level of free or available storage capacity is below a specified minimum threshold. In at least one embodiment, the requested rate increase can be based, at least in part, on the amount by which the current level of utilized or consumed storage capacity is above a specified maximum threshold.

In at least one embodiment, the storage system can provide feedback in the form of hints to one or more hosts to regulate or vary the rate at which such hosts send background operations or lower priority non-latency sensitive commands to the storage system. In at least one embodiment, the feedback or hints can be sent from the storage system to one or more hosts responsive to the storage system detecting the occurrence of one or more conditions. In at least one embodiment, the one or more conditions can include a first condition that denotes when a current measured latency is higher than a specified latency threshold thereby denoting an adverse performance impact on I/O requests as well as other higher priority and/or critical commands or requests. In response to detecting the first condition, the storage system can provide feedback to one or more hosts to reduce the rate at which one or more background operations or non-latency sensitive commands or typically lower priority commands are sent to the storage system where such commands can be expected to consume a large amount of one or more resources, such as CPU resources, exceeding a specified threshold. In at least one embodiment, the one or more conditions can include a second condition that denotes when an OOS condition has occurred, or is nearing such as within a specified window or percentage of an OOS threshold. In response to detecting the second condition, the storage system can provide feedback to one or more hosts to increase the rate at which one or more background operations or non-latency sensitive commands are sent to the storage system, where such commands can be expected to result in increasing the available or free storage capacity of the storage system.

In at least one embodiment, the techniques of the present disclosure provide for the storage system monitoring the state of the storage system. The storage system can have an aggregate or collective view of the overall I/O workload and background workload with respect to all hosts connected to the storage system. The storage system can, for example, monitor the performance impact of the storage system's background workload, such as from UNMAP commands, on overall I/O workload, including read/write I/Os. The storage system can also monitor other conditions of the storage system, such as the OOS condition. In response to the current state of the storage system based on one or more monitored conditions, the storage system can send suitable hints to hosts to vary or regulate their corresponding rates at which background operations, lower priority and/or non-latency sensitive commands, such as UNMAP commands, are sent to the storage system. In at least one embodiment, when the storage system detects that current measured latency exceeds a threshold, the storage system can provide suitable hints to the hosts with the goal of having the hosts reduce or lower the transmission rate of background operations, lower priority and/or non-latency sensitive requests such as UNMAP commands. The foregoing can have a goal of allowing resources, that would have been used for background operations, lower priority and/or non-latency sensitive commands, to alternatively be used in connection with servicing higher priority commands and requests including I/O workload, such as read and write I/O requests, to thereby reduce the request or command latency, including I/O latency. In at least one embodiment, when the storage system detects an OOS condition, the storage system can provide suitable hints to the hosts with the goal of having the hosts increase the number or the rate of background operations or requests such as UNMAP commands which are expected to result in increasing the amount of free or available storage capacity in the storage system and thereby alleviate or remove the OOS condition.

The foregoing and other aspects of the techniques of the present disclosure are described in more detail in the following paragraphs.

In at least one embodiment, various operations or commands can be considered and performed as background operations as described herein. In at least one embodiment, background commands or operations can include SCSI commands such as the UNMAP command, the XCOPY (extended copy) command, and/or the WRITESAME command. In at least one embodiment, the background commands or operations can more generally include offload copy operations such as the XCOPY or WRITESAME command. In at least one embodiment the background commands or operations can more generally include storage reclamation commands, such as the SCSI UNMAP command, as well as other similar storage reclamation commands of other supported protocols such as NVMe (Non-volatile Memory Express. For example, the background commands can include the NVMe DEALLOCATE command which is analogous to the SCSI UNMAP command in that the DEALLOCATE command deallocates a storage region and performs storage reclamation making the storage region available for reuse.

In at least one embodiment, background commands or operations can include the SCSI UNMAP command or operation. By issuing an UNMAP command, a host application or operating system specifies that a particular range of storage, such as for a particular LUN or logical device and associated LBA range, is no longer in use by the host application or operating system and can be reclaimed. As a result, the specified storage range or region of the UNMAP command is reclaimed by the storage system and thus increases the free or available storage capacity of the storage system. The UNMAP command can be issued, for example, by a host operating system when the host or application deletes one or more files from a file system, and/or deletes one or more tables from a database. Files can be mapped to underlying storage regions of block storage on one or more LUNs. Thus, the deleted files can be mapped to a storage region that can now be unmapped and deallocated or reclaimed. More generally, the UNMAP command can be used to specify a storage region that is no longer in use, whereby the storage region can be reclaimed for reuse and added to the free or available storage capacity in the storage system.

In at least one embodiment, background operations or commands can include offload copy or write operations such as the SCSI extended copy of XCOPY command and the SCSI WRITESAME command. Offload copy or write commands perform copy or write operations internal within the data storage system or appliance to copy data from a source to a target location, where the source (including the write data) and target (denoting the target location where the write data is copied to) can both be in the system or appliance. In at least one embodiment, the WRITE SAME command can be used to fill or write to a range of blocks on disk with a pattern or block of data specified by the command. For example, WRITE SAME can be used to write zeroes or some other specified content to a range of blocks.

In at least one embodiment, latency with respect to a command, request or operation received at a storage system from a client such as a host can generally denote an amount of time it takes to complete the command, request or operation. Thus latency can include an amount of wait time that the command, request or operation waits in a queue for processing.

In at least one embodiment operating in accordance with the SCSI standard, the host can send an UNMAP command to the data storage system. In response to the UNMAP command, the data storage system can send feedback to the host in the form of hints regarding a current data storage system state or condition. The host can take one or more corresponding actions responsive to the feedback or hints provided from the data storage system regarding the detected condition on the data storage system.

It should be noted that generally, the data storage system can provide feedback to the host identifying one or more detected conditions on the data storage system. In response to receiving the feedback information, the host can take one or more suitable actions. In at least one embodiment, the data storage system can provide the feedback regarding detected data storage system conditions or state in response to receiving a particular command, such as an UNMAP command, that can generally relate to a potential responsive action the host can perform. For example, the host can perform an action that includes varying the frequency or rate at which subsequent UNMAP commands are sent from the host to the storage system, where the variation in UNMAP command frequency or rate can depend, at least in part, on the particular condition detected as included in the feedback.

In at least one embodiment, the UNMAP command is an example of one command that can be characterized as follows: 1) under normal circumstances is not critical or of high priority (e.g., relative to operations, requests or commands such as I/O operations) from the perspective of the issuing host; 2) is not latency sensitive and does not need to be completed in a timely manner from the perspective of the issuing host; 3) can consume a relatively large amount of CPU and possibly other system resources to complete relative to other higher priority operations or commands such as I/O operations; and/or 4) can be performed as a background operation with a lower relative priority than other higher priority operations, commands or requests such as I/O operations. More generally, the techniques of the present disclosure can also be used in connection with one or more other commands, operations or requests, sometimes characterized as background operations as discussed herein, and is not limited to the UNMAP command. Generally, the UNMAP command can be further characterized as a storage reclamation command that frees, deallocates, unallocates or reclaims physical storage capacity for reuse. Other commands that can be further included in the category of storage reclamation commands can also be used in embodiments in accordance with the techniques of the present disclosure, where such other commands can vary with the particular supported standard and where such other commands can generally have one or more of the characteristics noted above in connection with the UNMAP command. For example, in at least one embodiment supporting NVMe, the NVMe deallocate command can be used in a manner similar to the UNMAP command as described herein, where the NVMe deallocate command is an example of a storage reclamation command similar to the SCSI UNMAP command.

In at least one embodiment in connection with detected data storage system occurrences of an exceeded latency threshold, one or more types of commands besides UNMAP commands can be varied or throttled. Each of the one or more commands, requests or operations suitable for throttling or varying the frequency or rate at which they are sent by the host to reduce I/O latency or request latency on the storage system can more generally include at least some of the characteristics noted above in connection with the UNMAP command, where reducing the current frequency or rate at which one or more hosts send subsequent such commands can be expected to substantially impact and reduce the measured I/O latency or request latency on the data storage system. In at least one embodiment, the particular command or request can generally be a non-latency sensitive, lower priority command that is expected to consume a relatively large amount of at least CPU resources, where the particular command can perform storage reclamation or more generally any other operation. To further illustrate, in at least one embodiment, the techniques of the present disclosure that provide for throttling or varying host issued UNMAP or storage reclamation commands can be extended for use in connection with other types of host commands, requests or operations including one or more of: offload copying operations, XCOPY commands or operations, WRITESAME commands or operations, VVOL or virtual volume bitmap operations, and the like. Thus, although following discussion and examples can be illustrated with respect to the UNMAP command, the techniques of the present disclosure can be more generally used in connection with other relevant commands, requests and operations such as noted above and elsewhere herein. In at least one embodiment, background operations can generally refer to one or more types of commands, requests or operations that possess the above-noted characteristics of the UNMAP command. In at least one embodiment, the background operations can include any one or more of: UNMAP or other storage reclamation commands, XCOPY, WRITE-SAME, and/or offload copy or write operations that copy or write at least a minimum amount of content or data.

In at least one embodiment, any one or more of the background operations, including UNMAP, can be throttled or varied in connection with the techniques herein as a means to reduce or regulate I/O or request latency on the data storage system. Thus in at least one embodiment, responsive to detecting an exceeded threshold I/O or request latency condition on the data storage system, the techniques of the present disclosure can provide feedback to one or more hosts to reduce the rate or frequency at which the hosts send one or more specified types of background operations or commands such as the UNMAP command. Consistent with other discussion herein in at least one embodiment, UNMAP or more generally storage reclamation commands are further one particular type of background operation or command that can also be throttled or varied in connection with increasing free or available storage capacity in the storage system.

In at least one embodiment in more detail using the SCSI UNMAP command, the feedback can be provided from the data storage system to the host using SCSI sense codes. In at least one embodiment, the host can send the UNMAP command to the storage system. In response, the storage system can send a response or reply including status information with an indicator, such as a check condition, denoting that the host can further request additional status information from the storage system. In response to receiving the UNMAP command's reply or response and indicator such as the check condition, the host can request the additional status information from the data storage system by issuing the SCSI Request Sense command to the data storage system. In response to the Request Sense command, the data storage system can return the additional status information that can include one or more SCSI sense codes. In at least one embodiment the one or more SCSI sense codes returned related to the check condition status of the UNMAP command can be included in the feedback or hints provided to the host.

In at least one embodiment, different defined SCSI sense codes can be returned to indicate the existence or occurrence of particular states or conditions on the data storage system. For example, multiple SCSI sense codes can be defined each denoting a different condition with respect to an amount by which a current latency metric on the data storage system exceeds a defined threshold latency. As another example, another set of SCSI sense codes can be defined each denoting a different condition with respect to a current level of consumed storage capacity with respect to one or more capacity thresholds.

Figure 3:
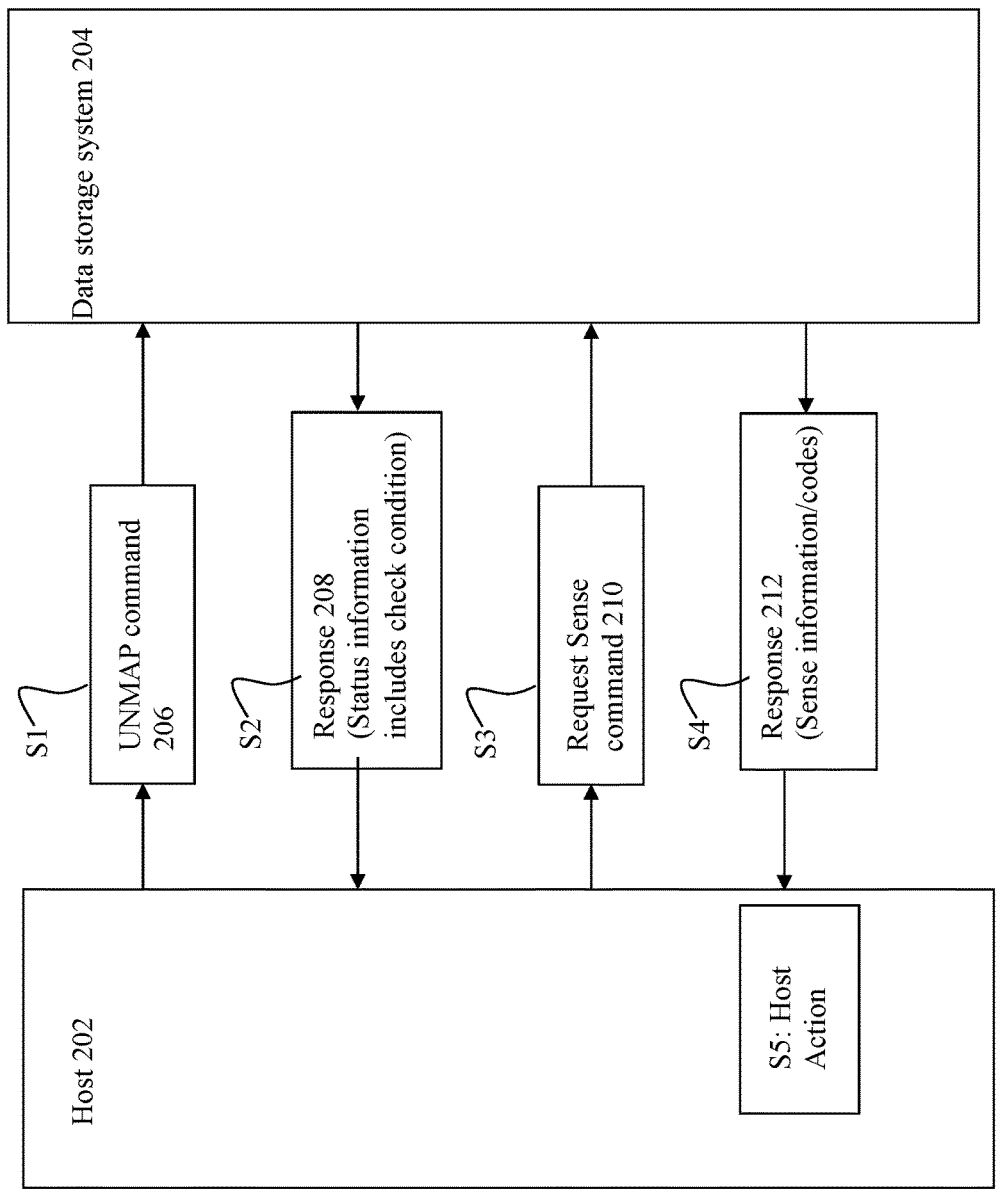
FIG. 3 is an example illustrating communications that can be exchanged between a host and a data storage system in at least one embodiment in accordance with techniques of the present disclosure.

Referring to FIG. 3, shown is an example 200 of components and associated commands and responses that can be used in at least one embodiment in connection with the techniques of the present disclosure.

The example 200 includes a host 202 and a data storage system 204. More generally, multiple hosts can be connected to and communicated with the storage system 204. However a single host 202 is included for simplicity in illustration although the storage system 204 can similarly communicate with multiple connected hosts.

At a step S1, the host 202 can send the UNMAP command 206 to the storage system 204. Following the step S1, a step S2 can be performed where the storage system 204 can send a response or reply 208 including status information with an indicator, such as a check condition, denoting that the host 202 can further request additional status information from the storage system.

Following the step S2, a step S3 can be performed. In response to receiving the UNMAP command's reply or response 208 and indicator such as the check condition in the step S2, the host 202 can then request (S3) the additional status information from the data storage system by issuing the SCSI Request Sense command 210 to the data storage system. In response to receiving the Request Sense command, the data storage system can return (in the step S4) a response 212 including the additional status information comprising one or more SCSI sense codes. In at least one embodiment the one or more SCSI sense codes returned related to the check condition status of the UNMAP command can be included in the feedback or hints provided to the host.

Following the step S4 in a step S5, the host can perform an action based, at least in part, on the sense information or code(s) received in the response 212. In at least one embodiment, the action can include throttling or varying the frequency or rate at which the host 202 sends subsequent UNMAP commands to the storage system 204 based, at least in part, on the additional status information of the response 212.

The example 200 illustrates processing with respect to the SCSI UNMAP command 206. More generally, the processing of the example 200 can also be performed with respect to using any suitable background command or operation as the command of 206. The subsequent sense codes and other information can vary with the particular background command or operation of 206. Examples of background operations or commands, such as the UNMAP and others, are discussed elsewhere herein.

It should be noted that FIG. 3 illustrates processing regarding communications that can be exchanged between a host and a data storage system operating in accordance with the SCSI protocol. More generally, any suitable communications can be exchanged between the host and the data storage system to provide the host with feedback including hints in accordance with SCSI, NVMe, and/or other suitable communications protocol in an embodiment in accordance with the techniques of the present disclosure.

Referring to FIG. 4, shown is an example 300 of a table of detected storage system conditions 302, corresponding SCSI sense codes 304, and corresponding host actions 306 in at least one embodiment in accordance with the techniques of the present disclosure.

The example 300 illustrates various storage system conditions 302 that can be detected and provided to the host as feedback in the form of sense codes 304. In particular, the table 300 specifies storage system conditions related to a latency metric or measurement, such as for command or request latency, exceeding a specified latency threshold. In at least one embodiment with reference back to FIG. 3, a relevant one of the SCSI sense codes 304 can be returned in connection with the response 212 when the command of 206 is an UNMAP command where the host can perform a corresponding action of 306 for the particular returned sense code of 304.

As noted above, the table 300 includes the following columns of information: storage system conditions 302, SCSI sense codes 304 and host actions 306. Each row of the table 300 denotes a set of information for a particular detected storage system condition. In at least one embodiment, the storage system can perform processing to monitor one or more latency-related metrics. The particular values of the latency threshold percentages in 302, particular sense code values in 304 and particular reduction rates or frequencies in 306 are examples provided for purposes of illustration.

In at least one embodiment, commands, operations or requests can be received by the storage system and placed in one or more front end (FE) queues of such commands, operations or requests waiting to be processed by the storage system. In at least one embodiment, the one or more FE queues can collectively form a single FE queue of waiting commands, requests or operations received by the storage system from one or more hosts or other storage clients. In at least one embodiment, the FE queue can be a FIFO (first in first out) queue of requests where newly added requests can be added to the tail of the FIFO queue and requests can be processed from the head of the FE queue in FIFO order. Thus in at least one embodiment, the next request to be processed can be the oldest command or request located at the head of the FIFO FE queue where the oldest command or request can also have the largest accumulated or total wait time in the queue of all requests or commands in the queue. In at least one embodiment, the FE queue can include multiple types of commands or requests received by the FE target ports of the storage system. Thus in at least one embodiment, the FE queue can include, for example, UNMAP commands, read and write I/O operations, XCOPY commands, and other commands waiting for processing. In at least one embodiment, commands in the FE queue having the FIFO ordering can accordingly also be ordered in terms of increasing total wait time denoting a request age, where older requests having a larger accumulated or total wait time are located closer to the front or head of the FE queue.

In at least one embodiment, the storage system can track, for each request or command in the FE queue, the request latency time denoting the amount of time the request waits in the FE queue for servicing. The latency related metric can be a request latency time denoting the accumulated or total wait time in wall clock or elapsed time of the command in the FE queue. In at least one embodiment, storage system can examine the request latency time denoting the total wait time of the request R1 at the head of the FE queue, where R1 is the oldest waiting request and R1 is the next request that will be selected for servicing or processing by the storage system. In at least one embodiment, if the request latency time of R1, the oldest waiting request and also the request to be serviced, exceeds a specified latency threshold, feedback information in the form of a suitable hint can be provided to the host in accordance with table 300. In particular, L1, denoting the current request latency of R1, can be used to select one of the appropriate rows of the table 300 by determining the particular range of latency values includes L1. Each entry in column 302 can have an associated range of latency values. In at least one embodiment, the specified latency threshold can be a suitable number of milliseconds (ms) such as 20 ms.

In at least one embodiment, the latency related metric can be the request latency time but with respect to only queued waiting UNMAP commands or, more generally, only queued waiting storage reclamation commands. Thus, the request latency used as the latency related metric can denote the request latency time of the oldest UNMAP command of the FE queue thereby denoting the largest request latency of any/all UNMAP commands waiting in the FE queue for processing. In such an embodiment, the storage system can track the request latency times for UNMAP commands waiting in the FE queue where the latency metric can be the largest request latency time with respect to all waiting UNMAP commands in the FE queue.

The row 308 can represent a specified normal range of latency values (302) of the latency metric for which no sense code is returned (304) and for which the host takes no corrective action to reduce latency.

The row 310 can represent a specified range of latency values (302) where the latency metric is 10% above a specified threshold, and where the latency metric also is not high enough to fall into a higher range of values denoted by one of the other rows 312, 314, 316, 318. If the latency metric falls into the range denoted by column 302 of row 310, the sense code of column 304 of row 310 can be returned to the hosts to denote the currently detected state or condition with respect to latency on the storage system. In response, the host can take the action denoted by column 306 of row 310 that indicates to reduce the host's current UNMAP rate or frequency to 90% of a specified default rate or frequency.

The row 312 can represent a specified range of latency values (302) where the latency metric is 20% above the specified threshold, and where the latency metric also is not high enough to fall into a higher range of values denoted by one of the other rows 314, 316, 318. If the latency metric falls into the range denoted by row 312, column 302, the sense code of column 304 of row 312 can be returned to the hosts to denote the currently detected state or condition with respect to latency on the storage system. In response, the host can take the action denoted by column 306 of row 312 that indicates to reduce the host's current UNMAP rate or frequency to 80% of a specified default rate or frequency.

The row 314 can represent a specified range of latency values (302) where the latency metric is 50% above the specified threshold, and where the latency metric also is not high enough to fall into a higher range of values denoted by one of the other rows 316, 318. If the latency metric falls into the range denoted by row 314, column 302, the sense code of column 304 of row 314 can be returned to the hosts to denote the currently detected state or condition with respect to latency on the storage system. In response, the host can take the action denoted by column 306 of row 314 that indicates to reduce the host's current UNMAP rate or frequency to 50% of a specified default rate or frequency.

The row 316 can represent a specified range of latency values (302) where the latency metric is 80% above the specified threshold, and where the latency metric also is not high enough to fall into a higher range of values denoted by one of the row 318. If the latency metric falls into the range denoted by column 302 of row 316, the sense code of column 304 of row 316 can be returned to the hosts to denote the currently detected state or condition with respect to latency on the storage system. In response, the host can take the action denoted by column 306 of row 316 that indicates to reduce the host's current UNMAP rate or frequency to 20% of a specified default rate or frequency.

The row 318 can represent a specified range of latency values (302) where the latency metric is more than 100% above the specified threshold. If the latency metric falls into the range denoted by column 302 of row 318, the sense code of column 304 of row 318 can be returned to the hosts to denote the currently detected state or condition with respect to latency on the storage system. In response, the host can take the action denoted by column 306 of row 318 that indicates to reduce the host's current UNMAP rate or frequency to 10% of a specified default rate or frequency.

In at least one embodiment, a host can send an UNMAP command to the storage system. In response to receiving the UNMAP command, communications can be exchanged between the host and storage system as described in connection with FIG. 3 where the storage system provides feedback or hints to the host regarding potential subsequent UNMAP command reductions such as in accordance with FIG. 4.

In at least one embodiment, a host can more generally send a type of background operation or command to the storage system. The particular type of command or operation can be, for example, a storage reclamation operation for a storage region of a minimum size, an XCOPY command performing a copy operation of a minimum size, a WRITE-SAME that writes a total amount of content of a minimum size, a VVOL bitmap command, and the like. In response to receiving the type of background command, communications can be exchanged between the host and storage system as described in connection with FIG. 3 where the storage system provides feedback or hints to the host regarding potential subsequent reductions of the particular type of background command or operation such as in accordance with FIG. 4.

In at least one embodiment, the storage system can track one or more other latency-related metrics. For example in at least one embodiment, the data storage system can continually count or track the current quantity of requests or commands waiting in the FE queue. The quantity of requests or commands waiting in the FE queue for processing can also be referred to as a queue depth of the FE queue. In at least one embodiment, the latency related metric can be the queue depth of the FE queue. If the queue depth of the FE queue of waiting requests exceeds MAX, a specified threshold maximum number of requests, feedback information in the form of a suitable hint can be provided to the host in accordance with a table 500 of FIG. 5 discussed below. In at least one embodiment, the storage system can track the number of UNMAP commands or requests, or more generally storage reclamation commands or background operations of a particular type, in the FE queue. If the number of such waiting UNMAP commands, storage reclamation commands or type of background commands exceeds a specified maximum, feedback information in the form of a suitable hint can be provided to a host in accordance with a table 500 of FIG. 5 discussed below.

Referring to FIG. 5, shown is an example 500 of a table of detected storage system conditions 502, corresponding SCSI sense codes 504, and corresponding host actions 506 in at least one embodiment in accordance with the techniques of the present disclosure.

The example 500 illustrates various storage system conditions 502 that can be detected and provided to the host as feedback in the form of sense codes 504. In particular, the table 500 specifies storage system conditions related to a second latency metric or measurement, the queue depth of the FE queue of waiting requests, exceeding a specified latency threshold MAX. In at least one embodiment with reference back to FIG. 3, a relevant one of the SCSI sense codes 504 can be returned in connection with the response 212 when the command of 206 is an UNMAP command where the host can perform a corresponding action of 506 for the particular returned sense code of 504.

As noted above, the table 500 includes the following columns of information: storage system conditions 502, SCSI sense codes 504 and host actions 506. Each row of the table 500 denotes a set of information for a particular detected storage system condition. In at least one embodiment, the storage system can perform processing to monitor one or more latency-related metrics. The particular values of the latency thresholds in 502, particular sense code values in 504 and particular reduction rates or frequencies in 506 are examples provided for purposes of illustration.

The row 508 can represent a specified normal range of latency values (502) of the second latency metric, queue depth of the FE queue of waiting requests, for which no sense code is returned (504) and for which the host takes no corrective action to reduce latency.

The row 510 can represent a specified range of latency values (502) where the quantity or queue depth Q of waiting requests in the FE queue is above a first threshold THRESH1 and where Q is also less than a second threshold THRESH2. In at least one embodiment, Q can be determined with respect to only UNMAP commands or only storage reclamation commands waiting in the FE queue. In this manner, Q can denote a count or quantity of the UNMAP commands or storage reclamation commands waiting in the FE queue for processing on the storage system.

If the latency metric Q falls into the range denoted by row 510, column 502, the sense code of column 504 of row 510 can be returned to the hosts to denote the currently detected state or condition with respect to latency on the storage system. In response, the host can take the action denoted by column 506 of row 510 that indicates to reduce the host's current UNMAP rate or frequency to X1% of a specified default rate or The row 512 can represent a specified range of latency values (502) where the quantity or queue depth Q of UNMAP requests in the FE queue is greater than or equal to THRESH2 and where Q is also less than a third threshold THRESH2. If the latency metric falls into the range denoted by row 512, column 502, the sense code of column 504 of row 512 can be returned to the hosts to denote the currently detected state or condition with respect to latency on the storage system. In response, the host can take the action denoted by column 506 of row 512 that indicates to reduce the host's current UNMAP rate or frequency to X2% of a specified default rate or frequency, where X1 can generally be less than X2.

The row 514 can represent a specified range of latency values (502) where the latency metric is more than THRESH3. If the latency metric falls into the range denoted by column 502 of row 514, the sense code of column 504 of row 514 can be returned to the hosts to denote the currently detected state or condition with respect to latency on the storage system. In response, the host can take the action denoted by column 506 of row 514 that indicates to reduce the host's current UNMAP rate or frequency to X3% of a specified default rate or frequency, where X2 can generally be less than X3.

In at least one embodiment consistent with discussion above, the current queue depth or count Q (denoting the number of UNMAP requests waiting on the FE queue to be processed or serviced) can be used to select one of the appropriate rows of the table 500 by determining which of the particular ranges of latency values (502) includes Q. Each entry in column 502 can have an associated range of latency values. The particular thresholds and ranges of the column 502 and the reduction rates of 506 can be suitable selected based on one or more factors, such as the number of hosts connected to the storage system, that can vary with embodiment.

In at least one embodiment, a host can send an UNMAP command to the storage system. In response to receiving the UNMAP command, communications can be exchanged between the host and storage system as described in connection with FIG. 3 where the storage system provides feedback or hints to the host regarding potential subsequent UNMAP command reductions such as in accordance with FIG. 5. In such a scenario, Q can correspond to the count of queued waiting UNMAP commands.

In at least one embodiment, a host can more generally send a type of background operation or command to the storage system. The particular type of command or operation can be, for example, a storage reclamation operation for a storage region of a minimum size, an XCOPY command performing a copy operation of a minimum size, a WRITE-SAME that writes a total amount of content of a minimum size, a VVOL bitmap command, and the like. In response to receiving the type of background command, communications can be exchanged between the host and storage system as described in connection with FIG. 3 where the storage system provides feedback or hints to the host regarding potential subsequent reductions of the particular type of background command or operation such as in accordance with FIG. 5. In such a scenario, Q can correspond to the count of queued waiting commands of the particular type of background operation.

In at least one embodiment, the data storage system can track and monitor one or both of the latency related metrics described in connection with FIGS. 4 and 5 in order detect occurrences of storage system conditions related to excessive latency-related metric value exceeding one or more specified thresholds.

Thus, the impact of the SCSI UNMAP command as discussed herein is an example of one particular type of background operation or command issued by hosts that can impact storage system performance. UNMAP commands in typical or normal conditions may not need to be completed in a timely fashion, can generally be characterized as a lower priority non-critical operation, and can have a high processing cost based on typical usage scenarios with relatively large storage regions being reclaimed. In at least one embodiment, host-side throttling of a host's UNMAP command frequency or rate can highly benefit applications that need the storage system to be responsive for higher priority mainstream application requests. As also discussed herein, the techniques of the present disclosure regarding UNMAP command throttling and host feedback can be applicable to SCSI and other suitable protocols, such as NVMe, and commands, such as deallocate, other storage reclamation and/or background operations. The techniques of the present disclosure can be extended for use with other types of background operations or requests made by hosts.

To further illustrate, in a typical usage scenario, a host can send to the storage system a relatively constant and steady stream of UNMAP requests without waiting for the storage system to respond to prior UNMAP requests. If the storage system is under heavy load, such UNMAP requests can be queued on the storage system awaiting processing as noted above. A progressive increase in queueing background commands such as the UNMAP commands, can adversely impact the storage system processing of more critical, higher priority commands, including I/O operations, that need more prompt expedient attention. For example, a host running one or more VMs can continually send 26 MBs/second worth of UNMAP requests on behalf of a file system on the host. The host can continue to send a second batch of UNMAP requests at the 26 MBs/second rate even though the host has not receive completion acknowledgement regarding a prior first batch of UNMAP requests also sent at a corresponding rate of 26 MBs/second.

Thus in at least one embodiment, the techniques of the present disclosure provide for a cooperation between a host with an operating system that interprets feedback from the storage system. In response to receiving the storage system feedback, the host can accordingly throttle up (e.g., accelerate) or throttle down (e.g., reduce or decelerate) the default or current UNMAP rate or frequency.

FIGS. 4 and 5 are described above with respect to a particular background operation or command, the UNMAP command, and latency-related metrics. More generally, the feedback information including SCSI sense codes can be returned in connection with any suitable background operation or command, some of which are described herein. Additionally, although the described host actions in column 306 of FIG. 4 and column 506 of FIG. 5 relate to a reduction rate or frequency with respect to the UNMAP command, the same or other suitable reduction rates can be used in connection with other background operations or commands.

In at least one embodiment, the various thresholds and associated reduction rates of FIGS. 4 and 5 can be used to throttle down or reduce the frequency or rate of UNMAP commands, as well as other background operations. As the observed or measured latency related metrics further vary (e.g. increase and/or decrease) over time, the storage system can continually provide further feedback to the host regarding changes in the latency related metrics in accordance with the tables of FIGS. 4 and 5. In at least one embodiment, the host can take corresponding actions as denoted in FIGS. 4 and 5 when the latency related metrics increase to thereby reduce the UNMAP rate or frequency. When the feedback information from the storage system indicates that the relative latency related metric decreases, the host can also take corrective action to increase or restore the UNMAP rate or frequency at which the host sends UNMAP commands to the storage system. In at least one embodiment, the host can generally increase its UNMAP rate or frequency in increments having a smaller granularity than those by which the UNMAP rate is reduced in connection with FIGS. 4 and 5. To further illustrate, when reducing the UNMAP rate, the host can use reduction rates as in FIGS. 4 and 5. For example, at a first point in time T1 with reference to FIG. 4, the latency metric can be 80% above the specified threshold (row 316) where the host can reduce its UNMAP rate to 20% of a specified default. At a second point in time T2 after T1, the latency metric can be only 10% above the specified threshold. As a result, the host can increase its UNMAP rate. However, in at least one embodiment, the host may not simply restore the UNMAP rate to 90% of the default value as denoted by column 306 of row 310. Rather, to avoid abrupt changes, the host can increment its UNMAP rate in multiple smaller steps or increments. For example, the host can first increase its UNMAP rate from 20% of the default value to 40% of the default value at time T2. At a third point in time T3 after T2 assuming that the latency-related metric remains at its current level (e.g., not more than 10% above the specified threshold) or lower, the host can further increase its UNMAP rate from 40% to 60% of the default value. At a fourth point in time T4 after T3 assuming that the latency-related metric remains at its current level (e.g., not more than 10% above the specified threshold) or lower, the host can further increase its UNMAP rate from 60% to 90% of the default value. In this manner, the host can generally increase its UNMAP rate in smaller increments or steps than the larger granularity of steps by which the host can reduce its UNMAP rate.

In some scenarios, the data storage system can reach an OOS condition or state, or can be approaching an OOS condition or state, when consumed storage reaches threshold consumption levels. In at least one embodiment, the storage system can detect the OOS condition, or the fact that the system is approaching the OOS condition or state, and allow waiting queued UNMAP commands to run without any delay so that storage space can be freed thereby increasing free storage capacity. When the storage system is approaching an OOS condition or state, it can be better for the host applications to have longer latencies as compared to an OOS condition. In at least one embodiment, an OOS condition is one such scenario and there can be other factors affecting the decision of whether or not to delay UNMAP commands.

As discussed herein, the storage system can free allocated blocks for future usage in response to detected OOS scenarios. In at least one embodiment, the storage system can monitor and detect OOS conditions, or generally, storage capacity conditions, and provide appropriate feedback in the form of SCSI check conditions to the host. The storage system can send different SCSI check conditions at each of multiple defined capacity thresholds denoting various degrees of OOS conditions so that hosts are aware that they should try to increase their SCSI UNMAP rate from the default rate to a higher rate to further accelerate storage reclamation and increasing the amount of free storage capacity in the storage system. For example, a host can have a specified default UNMAP rate or frequency that suffices until the capacity usage threshold reaches 90% (where 90% of the storage system's storage capacity is consumed with 10% free or unused). However, when storage capacity consumption exceeds the 90% usage or consumption threshold, an SCSI check condition can be sent as part of the UNMAP response to indicate to the host to increase the UNMAP rate above the default UNMAP rate. In at least one embodiment, the amount by which the storage system can request that a host exceed its default UNMAP rate can be based, at least in part, on an amount by which the 90% capacity usage threshold is exceeded.

Referring to FIG. 6, shown is an example 400 of a table of detected storage system conditions 402, corresponding SCSI sense codes 404, and corresponding host actions 406 in at least one embodiment in accordance with the techniques of the present disclosure.

The example 400 illustrates various storage system conditions 402 that can be detected and provided to the host as feedback in the form of sense codes 404. In particular, the table 400 specifies storage system conditions related to storage capacity consumption on the data storage system. In at least one embodiment with reference back to FIG. 3, a relevant one of the SCSI sense codes 404 can be returned in connection with the response 212 when the command of 206 is an UNMAP command where the host can perform a corresponding action of 406 for the particular returned sense code of 404 denoting the current state of storage consumption with respect to one or more defined thresholds.

The table 400 includes the following columns of information: storage system conditions 402, SCSI sense codes 404 and host actions 406. Each row of the table 400 denotes a set of information for a particular detected storage system condition. In at least one embodiment, the storage system can perform processing to monitor one or more metrics regarding storage consumption or free storage levels in the system. The particular values of the thresholds in 402, particular sense code values in 404 and particular rates or frequencies in 406 are examples provided for purposes of illustration.

The row 407 can represent a specified normal storage capacity consumption range (402) for which no sense code is returned (404) and for which the host takes no corrective action to increase its UNMAP rate. In at least one embodiment, the normal range of storage capacity consumption can be 90% or less with respect to the total storage capacity in the system. When the storage capacity consumption is more than 90%, a corresponding one of the sense codes of 404 can be returned in accordance with the particular current storage capacity consumption.

The row 408 can represent a specified storage capacity consumption range (402) above 90% and also equal to or less than 92%. If the storage consumption metric falls into the range denoted by column 402 of row 408, the sense code of column 404 of row 408 can be returned to the hosts to denote the currently detected state or condition with respect to storage consumption. In response, the host can take the action denoted by column 406 of row 408 that indicates to increase the host's current UNMAP rate or frequency 120% of a specified default rate or frequency.

The row 410 can represent a specified storage capacity consumption range (402) above 92% and also equal to or less than 95%. If the storage consumption metric falls into the range denoted by column 402 of row 410, the sense code of column 404 of row 410 can be returned to the hosts to denote the currently detected state or condition with respect to storage consumption. In response, the host can take the action denoted by column 406 of row 410 that indicates to increase the host's current UNMAP rate or frequency 130% of a specified default rate or frequency.

The row 412 can represent a specified storage capacity consumption range (402) above 95% and also equal to or less than 97%. If the storage consumption metric falls into the range denoted by column 402 of row 412, the sense code of column 404 of row 412 can be returned to the hosts to denote the currently detected state or condition with respect to storage consumption. In response, the host can take the action denoted by column 406 of row 412 that indicates to increase the host's current UNMAP rate or frequency 150% of a specified default rate or frequency.

The row 414 can represent a specified storage capacity consumption range (402) above 97%. If the storage consumption metric falls into the range denoted by column 402 of row 414, the sense code of column 404 of row 414 can be returned to the hosts to denote the currently detected state or condition with respect to storage consumption. In response, the host can take the action denoted by column 406 of row 414 that indicates to increase the host's current UNMAP rate or frequency 200% of a specified default rate or In at least one embodiment, the various thresholds and associated increase in UNMAP rates of FIG. 6 can be used to throttle up or increase the frequency or rate of UNMAP commands. As the consumed storage capacity further varies (e.g. increase and/or decrease) over time, the storage system can continually provide further feedback to the host regarding changes in the storage consumption in accordance with the table of FIG. 6. In at least one embodiment, the host can take corresponding actions as denoted in FIG. 6 when the consumed storage capacity increases to threshold levels to thereby increase the host's UNMAP rate or frequency. When the feedback information from the storage system indicates that the amount of free storage increases or the amount of consumed storage decreases, the host can also take corrective action to throttle down or decrease the UNMAP rate or frequency at which the host sends UNMAP commands to the storage system. In at least one embodiment, the host can generally decrease its UNMAP rate or frequency in increments having a smaller granularity than those by which the UNMAP rate is increased with respect to detected increases in storage capacity consumption as in FIG. 6.

To further illustrate, when incrementing the UNMAP rate in connection with various OOS conditions, the host can use UNMAP rate increases as in FIG. 6. For example, at a first point in time T11 with reference to FIG. 6, the current storage consumption can be 98% of the system storage capacity so that the information of row 414 is relevant where the host can increase its UNMAP rate to 200% of the specified default. At a second point in time T12 after T11, the current storage consumption can decrease to 93% and can correspond to the consumption range (402) of row 410. As a result, the host can decrease its UNMAP rate. However, in at least one embodiment, the host may not simply restore the UNMAP rate to 130% of the default value as denoted by column 406 of row 410. Rather, to avoid abrupt changes, the host can decrease its UNMAP rate in multiple smaller steps or increments. For example, the host can first decrease its UNMAP rate from 200% of the default value to 180% of the default value at time T12. At a third point in time T13 after T12 assuming that the storage capacity consumption does not further increase, the host can further decrease its UNMAP rate from 180% to 160% of the default value. At a fourth point in time T14 after T13 assuming that storage capacity consumption does not further increase, the host can further decrease its UNMAP rate from 160% to 130% of the default value. In this manner, the host can generally decrease its UNMAP rate in smaller increments or steps than the larger granularity of steps by which the host increases its UNMAP rate in accordance with FIG. 6.

It should be noted that FIG. 6 illustrates use of a first storage capacity related metric of consumed storage capacity express as a percentage of the total storage capacity of the storage system. A complementary metric of consumed storage capacity can also be utilized denoting an amount or percentage of free, unconsumed storage capacity of the system. Thus, for example, if the storage capacity consumption is 80%, the free storage capacity is 20%. Rather than, or in addition to, using a storage capacity consumption metric, an embodiment can use a free or available storage capacity metric. It is straightforward to alternatively specify threshold ranges for free or available storage capacity in column 402 rather than storage capacity consumption ranges. In this manner, the storage capacity metric can be expressed as an amount or percentage of free available storage capacity and the associated thresholds of 402 can similarly be based on free storage capacity thresholds as illustrated in FIG. 7.

Referring to FIG. 7, shown is an example 450 of a table of detected storage system conditions 452, corresponding SCSI sense codes 454, and corresponding host actions 456 in at least one embodiment in accordance with the techniques of the present disclosure.

The example 450 illustrates various storage system conditions 402 that can be detected and provided to the host as feedback in the form of sense codes 454. In particular, the table 450 specifies storage system conditions related to storage capacity consumption on the data storage system. In at least one embodiment with reference back to FIG. 3, a relevant one of the SCSI sense codes 454 can be returned in connection with the response 212 when the command of 206 is an UNMAP command where the host can perform a corresponding action of 456 for the particular returned sense code of 404 denoting the current state of storage consumption with respect to one or more defined thresholds.

The table 450 includes the following columns of information: storage system conditions 452, SCSI sense codes 454 and host actions 456. Each row of the table 450 denotes a set of information for a particular detected storage system condition. In at least one embodiment, the storage system can perform processing to monitor one or more metrics regarding storage consumption or free storage levels in the system. The particular values of the thresholds in 452, particular sense code values in 404 and particular rates or frequencies in 456 are examples provided for purposes of illustration.

The row 457 can represent a specified normal free storage capacity range (452) for which no sense code is returned (454) and for which the host takes no corrective action to increase its UNMAP rate. In at least one embodiment, the normal free storage capacity can be 10% or more with respect to the total storage capacity in the system. When the free storage capacity is less than 10%, a corresponding one of the sense codes of 454 can be returned in accordance with the particular current storage capacity consumption.

The row 458 can represent a specified free storage capacity consumption range (452) below 10% and also greater than or equal to than 8%. If the storage consumption metric falls into the range denoted by column 452 of row 458, the sense code of column 454 of row 458 can be returned to the hosts to denote the currently detected state or condition with respect to free storage capacity in the storage system. In response, the host can take the action denoted by column 456 of row 458 that indicates to increase the host's current UNMAP rate or frequency 120% of a specified default rate or frequency.

The row 460 can represent a specified free storage capacity range (462) below 8% and also greater than or equal to 5%. If the free storage capacity falls into the range denoted by column 452 of row 460, the sense code of column 454 of row 460 can be returned to the hosts to denote the currently detected state or condition with respect to free storage capacity. In response, the host can take the action denoted by column 456 of row 460 that indicates to increase the host's current UNMAP rate or frequency 130% of a specified default rate or frequency.

The row 462 can represent a specified free storage capacity range (452) below 5% and also greater than or equal to 3%. If the current free storage capacity falls into the range denoted by column 452 of row 462, the sense code of column 454 of row 462 can be returned to the hosts to denote the currently detected state or condition with respect to free storage capacity. In response, the host can take the action denoted by column 456 of row 462 that indicates to increase the host's current UNMAP rate or frequency 150% of a specified default rate or frequency.

The row 464 can represent a specified free storage capacity range (452) below 3%. If the free storage capacity falls into the range denoted by column 452 of row 464, the sense code of column 454 of row 464 can be returned to the hosts to denote the currently detected state or condition with respect to storage consumption.

In response, the host can take the action denoted by column 456 of row 464 that indicates to increase the host's current UNMAP rate or frequency 200% of a specified default rate or frequency.

In at least one embodiment, the various thresholds and associated increase in UNMAP rates of FIG. 7 can be used to throttle up or increase the frequency or rate of UNMAP commands. As the free storage capacity further varies (e.g., increase and/or decrease) over time, the storage system can continually provide further feedback to the host regarding changes in the free storage capacity in accordance with the table of FIG. 7. In at least one embodiment, the host can take corresponding actions as denoted in FIG. 7 when the free storage capacity decreases to threshold levels to thereby increase the host's UNMAP rate or frequency.

When the feedback information from the storage system indicates that the amount of free storage increases or the amount of consumed storage decreases, the host can also take corrective action to throttle down or decrease the UNMAP rate or frequency at which the host sends UNMAP commands to the storage system. In at least one embodiment, the host can generally decrease its UNMAP rate or frequency in increments having a smaller granularity than those by which the UNMAP rate is increased with respect to detected increases in storage capacity consumption as in FIG. 7. The foregoing is similar to that as described above in connection with FIG. 6 to throttle down the UNMAP rate of a host as the storage capacity consumed decreases (thereby corresponding to increases in free storage capacity).

In at least one embodiment, one or more additional techniques can also be used in connection with the techniques of the present disclosure to regulate the processing of UNMAP commands based on latency impact on host or client read and write I/Os as well as other activity having a higher priority than UNMAP commands. For example, in at least one embodiment, the techniques as described in U.S.

patent application Ser. No. 18/120,702, filed Mar. 13, 2023, Subramanian et al., DATA STORAGE SYSTEM EMPLOYING PARTIAL RESPONSES TO INFLUENCE RATE OF BULK STORAGE OPERATIONS, and/or U.S. patent application Ser. No. 16/530,839, filed Aug. 2, 2019, Vankamamidi et al., SYSTEM AND METHOD FOR PRIORITY ORCHESTRATION AND SCHEDULING OF DIFFERENT BACKGROUND OPERATIONS, both of which are incorporated by reference herein, can be performed in addition to using the techniques of the present disclosure.

Figure 8:
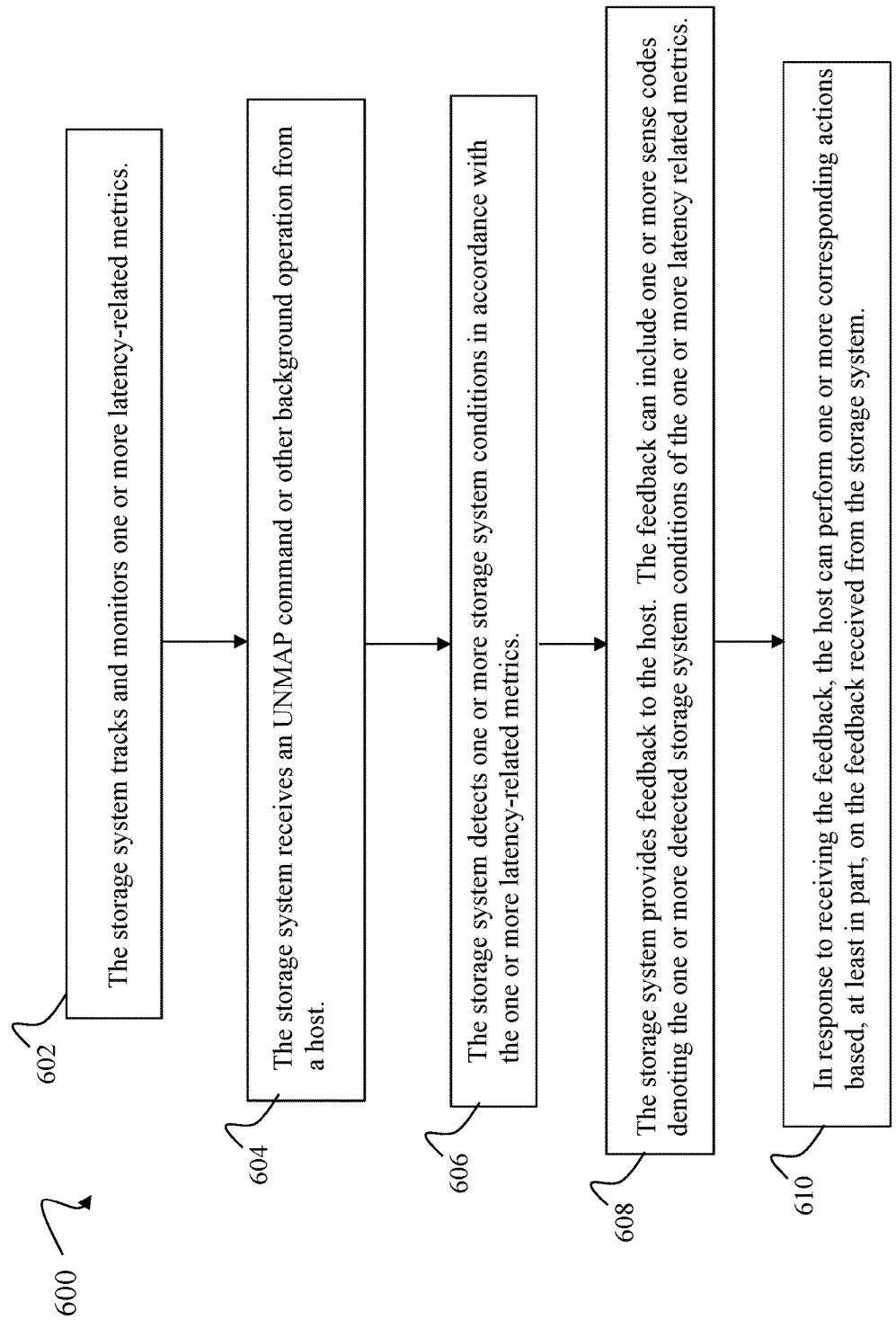
FIGS. 8 and 9 are flowcharts of processing steps that can be performed in at least one embodiment in accordance with techniques of the present disclosure.

Referring to FIG. 8, shown is a flowchart 600 of processing steps that can be performed in at least one embodiment in accordance with the techniques of the present disclosure.

At the step 602, the storage system tracks and monitors one or more latency-related metrics. Following the step 602, a step 604 can be performed.

At the step 604, The storage system receives an UNMAP command or other background operation from a host. Following the step 604 is a step 606.

At the step 606, the storage system detects one or more storage system conditions in accordance with the one or more latency-related metrics. Following the step 606 is a step 608.

At the step 608, the storage system provides feedback to the host. The feedback can include one or more sense codes denoting the one or more detected storage system conditions of the one or more latency related metrics. From the step 608, control proceeds to the step 610.

At the step 610, in response to receiving the feedback, the host can perform one or more corresponding actions based, at least in part, on the feedback received from the storage system. In at least one embodiment, the step 610 can include the host throttling up or down the current frequency or rate at which UNMAP commands and/or one or more other types of background operations are sent from the host to the storage system.

In at least one embodiment, the processing of the flowchart 600 can be performed with respect to an UNMAP command where the latency-related metric(s) and feedback sent to the host are based on the UNMAP command and provided in response to the storage system receiving an UNMAP command from the host. More generally, the processing of the flowchart 600 can be performed with respect to a particular type of background command where the latency-related metric(s) and feedback sent to the host are based on the particular type of background command and provided in response to the storage system receiving an instance of the particular background command from the host.

Figure 9:
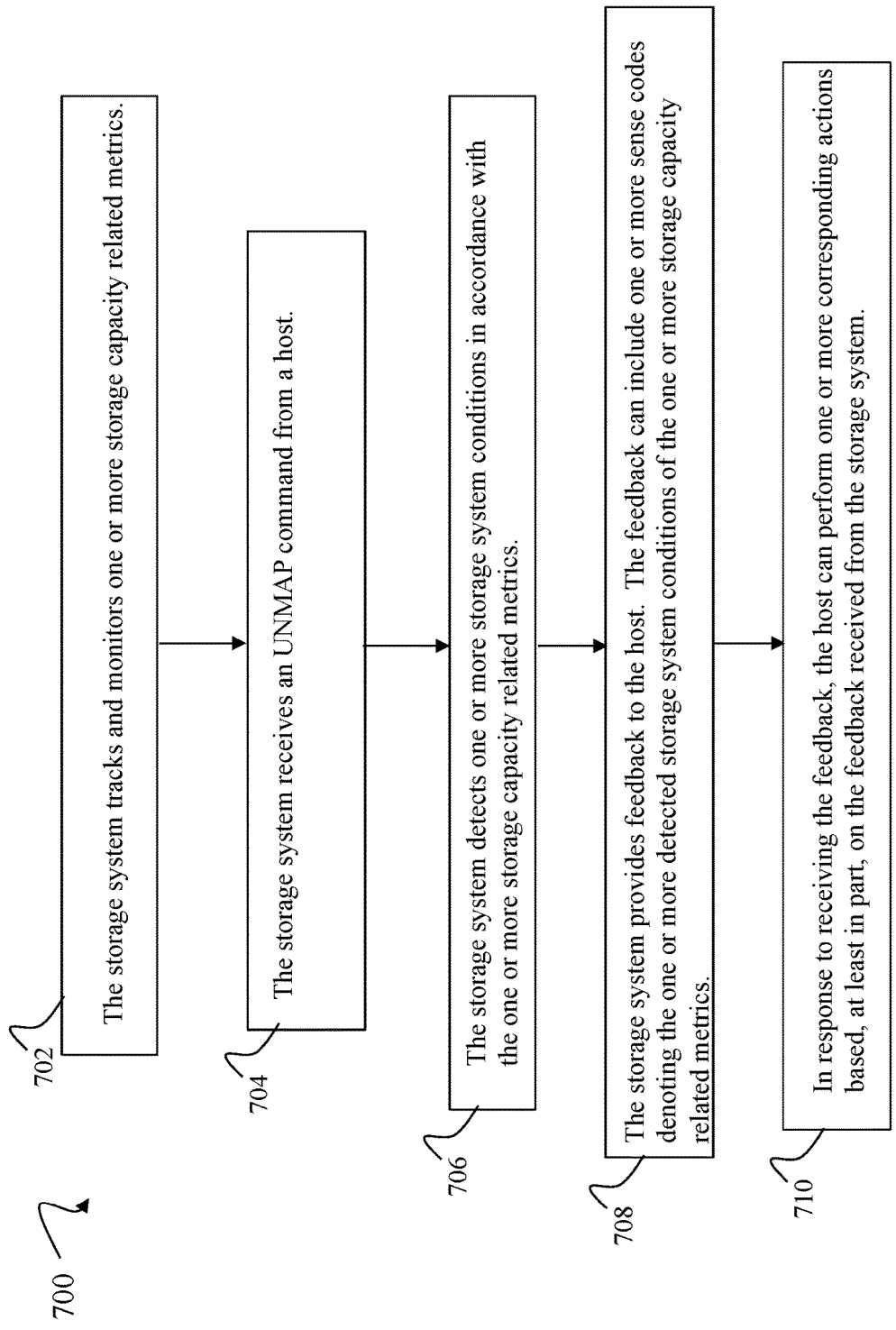

Referring to FIG. 9, shown is a flowchart 700 of processing steps that can be performed in at least one embodiment in accordance with the techniques of the present disclosure.

At the step 702, the storage system tracks and monitors one or more storage capacity related metrics. Following the step 702, a step 704 can be performed.

At the step 704, The storage system receives an UNMAP command, or more generally a storage reclamation command, from a host. Following the step 704 is a step 706.

At the step 706, the storage system detects one or more storage system conditions in accordance with the one or more storage capacity related metrics. Following the step 706 is a step 708.

At the step 708, the storage system provides feedback to the host. The feedback can include one or more sense codes denoting the one or more detected storage system conditions of the one or more storage capacity related metrics. From the step 708, control proceeds to the step 710.

At the step 710, in response to receiving the feedback, the host can perform one or more corresponding actions based, at least in part, on the feedback received from the storage system. In at least one embodiment, the step 610 can include the host throttling up or down the current frequency or rate at which UNMAP commands are sent from the host to the storage system.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   sending, from a host to a data storage system, a first storage reclamation command that identifies a first storage region of physical storage available for reclamation and reuse;
   in response to the data storage system receiving the first storage reclamation command, sending from the data storage system to the host first feedback information identifying at least a first detected condition on the data storage system; and
   in response to receiving the first feedback information at the host, the host varying a current rate or frequency of subsequent storage reclamation commands sent to the data storage system based, at least in part, on the first feedback information regarding the first detected condition on the data storage system;
   wherein the first detected condition of the first feedback information indicates that a first latency metric on the data storage system exceeds a specified latency threshold;
   wherein the method further comprises:
   the data storage system monitoring a plurality of storage reclamation commands waiting in a queue for processing by the data storage system, wherein the plurality of storage reclamation commands includes a second storage reclamation command denoting a next of the plurality of storage reclamation commands to be processed, wherein said second reclamation command has been waiting in the queue longer than any others of the plurality of storage reclamation commands, wherein said monitoring includes calculating a corresponding accumulated latency of the second storage reclamation command denoting a total amount of time the second storage reclamation command has waited for processing by the data storage system, and
   wherein the corresponding accumulated latency of the second storage reclamation command is the first latency metric on the data storage system.

2. The computer-implemented method of claim 1, wherein the first storage region corresponds to a portion of physical storage of the data storage system mapped to one or more deleted storage objects.

3. The computer-implemented method of claim 2, wherein the one or more deleted storage objects include any of: one or more deleted files, a deleted file system, one or more deleted portions of one or more file systems, and one or more deleted directories.

4. The computer-implemented method of claim 1, further comprising:
servicing the first storage reclamation command on the data storage system and reclaiming the first storage region as free, available or unused storage capacity; and
updating one or more storage capacity metrics in accordance with said reclaiming the first storage region.

5. The computer-implemented method of claim 4, wherein said updating further comprises:
increasing, by a first amount, a first storage metric denoting an amount of free storage capacity in the data storage system, wherein the first amount corresponds to an amount of storage capacity of the first storage region that has been reclaimed.

6. The computer-implemented method of claim 4, wherein said updating further comprises:
decreasing, by a first amount, a first storage metric denoting an amount of consumed or utilized storage capacity in the data storage system, wherein the first amount corresponds to an amount of storage capacity of the first storage region that has been reclaimed.

7. The computer-implemented method of claim 1, wherein in response to receiving the first feedback information at the host, the host reduces the current rate or frequency at which the host sends subsequent storage reclamation commands to the data storage system.

8. The computer-implemented method of claim 7, wherein the first feedback information indicates that the first latency metric on the data storage system exceeds the specified latency threshold by a first amount.

9. The computer-implemented method of claim 8, wherein the host reduces the current frequency or rate at which the host sends subsequent storage reclamation commands to the data storage system by a first reduction amount based, at least in part, on the first amount by which the first latency metric of the data storage system exceeds the specified threshold.

10. The computer-implemented method of claim 9, wherein the host reducing the current frequency or rate at which the host sends subsequent storage reclamation commands to the data storage system is expected to reduce measured request latency, including I/O latency and I/O response time, on the data storage system.

11. The computer-implemented method of claim 1, further comprising:
the data storage system monitoring a quantity of storage reclamation commands waiting in one or more queues for processing by the data storage system, and
wherein the quantity of storage reclamation commands waiting for processing is the first latency metric on the data storage system, and wherein the quantity denotes any of: a maximum number of storage reclamation commands awaiting processing during a specified time period, and an average number of storage reclamation commands awaiting processing during a specified time period.

12. The computer-implemented method of claim 1, wherein the first detected condition of the first feedback information indicates one or more of: that consumed storage capacity of the data storage system has exceeded a first capacity threshold, and that free storage capacity of the data storage system has fallen below a free capacity threshold.

13. The computer-implemented method of claim 12, wherein in response to receiving the first feedback information at the host, the host increases the current rate or frequency at which the host sends subsequent storage reclamation commands to the data storage system.

14. The computer-implemented method of claim 13, wherein the host increases the current frequency or rate at which the host sends subsequent storage reclamation commands to the data storage system by a first amount based, at least in part, on current capacity consumption and/or current free storage capacity as identified in the first feedback information from the data storage system.

15. The computer-implemented method of claim 1, wherein the first storage reclamation command is any of an unmap command, a deallocate command, and an unallocate command.

16. The computer-implemented method of claim 1, further comprising:
sending, from the data storage system to the host, a first reply including a status indicator that additional status information is available regarding the first storage reclamation command;
in response to receiving the first reply, the host sending to the data storage system a request for the additional status information; and
in response to receiving the request for the additional status information, the data storage system sending the first feedback information to the host.

17. A system comprising:
one or more processors; and
a memory comprising code stored thereon that, when executed, performs a method comprising:
sending, from a host to a data storage system, a first storage reclamation command that identifies a first storage region of physical storage available for reclamation and reuse;
in response to the data storage system receiving the first storage reclamation command, sending from the data storage system to the host first feedback information identifying at least a first detected condition on the data storage system; and
in response to receiving the first feedback information at the host, the host varying a current rate or frequency of subsequent storage reclamation commands sent to the data storage system based, at least in part, on the first feedback information regarding the first detected condition on the data storage system;
wherein the first detected condition of the first feedback information indicates that a first latency metric on the data storage system exceeds a specified latency threshold;
wherein the method further comprises:
the data storage system monitoring a plurality of storage reclamation commands waiting in a queue for processing by the data storage system, wherein the plurality of storage reclamation commands includes a second storage reclamation command denoting a next of the plurality of storage reclamation commands to be processed, wherein said second reclamation command has been waiting in the queue longer than any others of the plurality of storage reclamation commands, wherein said monitoring includes calculating a corresponding accumulated latency of the second storage reclamation command denoting a total amount of time the second storage reclamation command has waited for processing by the data storage system, and wherein the corresponding accumulated latency of the second storage reclamation command is the first latency metric on the data storage system.

18. The system of claim 17, wherein the first storage region corresponds to a portion of physical storage of the data storage system mapped to one or more deleted storage objects.

19. A non-transitory computer-readable memory comprising code stored thereon that, when executed, performs a method comprising:

sending, from a host to a data storage system, a first storage reclamation command that identifies a first storage region of physical storage available for reclamation and reuse;

in response to the data storage system receiving the first storage reclamation command, sending from the data storage system to the host first feedback information identifying at least a first detected condition on the data storage system; and in response to receiving the first feedback information at the host, the host varying a current rate or frequency of subsequent storage reclamation commands sent to the data storage system based, at least in part, on the first feedback information regarding the first detected condition on the data storage system;

wherein the first detected condition of the first feedback information indicates that a first latency metric on the data storage system exceeds a specified latency threshold;

wherein the method further comprises:

the data storage system monitoring a plurality of storage reclamation commands waiting in a queue for processing by the data storage system, wherein the plurality of storage reclamation commands includes a second storage reclamation command denoting a next of the plurality of storage reclamation commands to be processed, wherein said second reclamation command has been waiting in the queue longer than any others of the plurality of storage reclamation commands, wherein said monitoring includes calculating a corresponding accumulated latency of the second storage reclamation command denoting a total amount of time the second storage reclamation command has waited for processing by the data storage system, and wherein the corresponding accumulated latency of the second storage reclamation command is the first latency metric on the data storage system.

20. The non-transitory computer-readable memory of claim 19, wherein the first storage region corresponds to a portion of physical storage of the data storage system mapped to one or more deleted storage objects.

* * * * *